United States Patent
Fach et al.

(10) Patent No.: US 10,523,695 B2
(45) Date of Patent: Dec. 31, 2019

(54) THREAT MODELING TOOL USING MACHINE LEARNING

(71) Applicant: SAP SE, Walldorf (DE)

(72) Inventors: Peter Fach, Wiesloch (DE); Paul El Khoury, Heidelberg (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 15/657,782

(22) Filed: Jul. 24, 2017

(65) Prior Publication Data

US 2019/0028498 A1 Jan. 24, 2019

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1416* (2013.01); *H04L 63/1433* (2013.01)

(58) Field of Classification Search
CPC ............. H04L 63/1425; H04L 63/1433; H04L 63/1416; G06N 20/00
See application file for complete search history.

(56) References Cited

U.S. PATENT DOCUMENTS

| | | | | |
|---|---|---|---|---|
| 6,175,948 | B1 * | 1/2001 | Miller | G06F 17/5045 716/105 |
| 7,313,773 | B1 * | 12/2007 | Braun | G06F 17/5022 716/103 |
| 9,280,326 | B1 * | 3/2016 | Braun | G06F 8/37 |
| 10,216,938 | B2 * | 2/2019 | Reith | G06F 21/577 |
| 2005/0268326 | A1 * | 12/2005 | Bhargavan | H04L 63/102 726/1 |
| 2013/0031622 | A1 * | 1/2013 | Berg | G06F 21/577 726/17 |
| 2015/0317563 | A1 * | 11/2015 | Baldini Soares | G06N 20/00 706/12 |
| 2015/0319185 | A1 * | 11/2015 | Kirti | H04L 63/1416 726/23 |
| 2015/0339477 | A1 * | 11/2015 | Abrams | G06F 21/554 726/23 |
| 2015/0347759 | A1 * | 12/2015 | Cabrera | G06F 21/577 726/25 |
| 2015/0347908 | A1 * | 12/2015 | Mathew | G06N 5/04 706/12 |
| 2016/0156655 | A1 * | 6/2016 | Lotem | H04L 63/145 726/23 |
| 2017/0372071 | A1 * | 12/2017 | Saxe | G06F 21/567 |
| 2018/0330097 | A1 * | 11/2018 | Dietsch | G06F 17/5022 |
| 2018/0330101 | A1 * | 11/2018 | Dietsch | G06F 21/52 |

* cited by examiner

*Primary Examiner* — John B King
(74) *Attorney, Agent, or Firm* — Jones Day (57) ABSTRACT

Data is received that characterizes a software system. Thereafter, a threat model is generated, using at least one machine learning model, that optimally characterizes cybersecurity threats associated with the software system and provides security measures to counter such threats. The at least one machine learning model is trained using a plurality of historically generated threat models for a plurality of differing software systems. Subsequently, data can be provided that includes or otherwise characterizes the generated threat model.

20 Claims, 4 Drawing Sheets

THREAT MODELING TOOL USING MACHINE LEARNING

TECHNICAL FIELD

The subject matter described herein relates to a tool for modeling cybersecurity threats that utilizes machine learning to optimally characterize risks associated with a software system and which provides security features to mitigate such risks.

BACKGROUND

Software and computer systems are increasingly being subjected to cyber security attacks. These attacks are becoming more prevalent, in part, due to increasingly complex and distributed software systems which involve dozens up to thousands of computing nodes. As a result, threat modeling is becoming increasingly utilized by software developers during design time to identify potential vulnerabilities of software systems so that they can be addressed prior to deployment.

SUMMARY

In one aspect, data is received that characterizes a software system. Thereafter, a threat model is generated, using at least one machine learning model, that optimally characterizes cybersecurity threats associated with the software system and provides security measures to counter such threats. The at least one machine learning model is trained using a plurality of historically generated threat models for a plurality of differing software systems. Subsequently, data can be provided that includes or otherwise characterizes the generated threat model.

The software system can be decomposed to define data flow diagrams characterizing interactions of the software system with external entities and networks. A target architecture model (TAM) diagram can be generated based on the decomposed software system. The TAM diagram can be used by the at least one machine learning model to generate the threat model. A first machine learning model of the at least one machine learning model can classify the TAM diagram by actor/dependency pairs. A second machine learning model of the at least one machine learning model can match the received data to an optimal use case.

The at least one machine learning model can, for example, utilize random forest for identifying an optimal threat model template and generating the threat model.

Providing data can include one or more of causing the data comprising the generated threat model to be displayed in an electronic visual display, transmitting the data comprising the generated threat model to a remote computing system, loading the data comprising the generated threat model into memory, or storing the data comprising the generated threat model into physical persistence.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for optimally modeling the risks of cyber breaches on a software system that leverages knowledge obtained from earlier implementations.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to an enhanced threat modeling platform in which optimal threat models for a particular software system can be identified and/or selected using machine learning. This platform leverages one or more machine learning models that are trained using threat model information for a large number of software system deployments. The threat models or portions thereof can be browsed or otherwise suggested to software developers using a graphical user interface.

Figure 1:
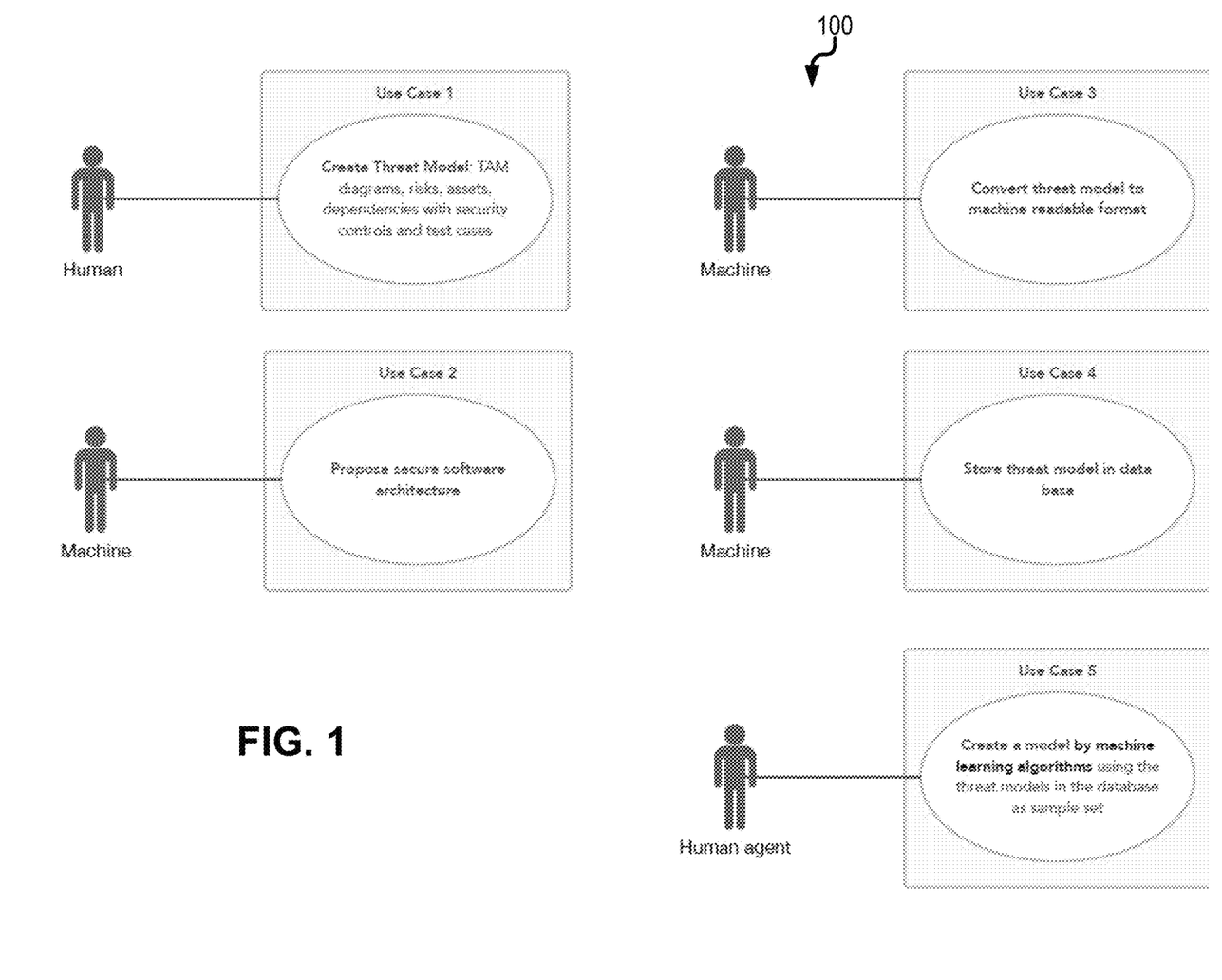
FIG. 1 is a diagram illustrating sample use cases for the current subject matter.

FIG. 1 is a diagram 100 illustrating various use cases for the threat modeling tool as provided herein. Use case, in this sense, can mean a particular behavior of the software system (e.g., a WebApp) that helps the user achieve a certain goal. The threat modeling tool can provide a graphical user interface-based modeling environment in which a user can implement (i.e., create, maintain, etc.) various use-cases of the software system that is being threat modeled. In some variations, the tool only provides one or more some of the use cases described herein.

Figure 2:
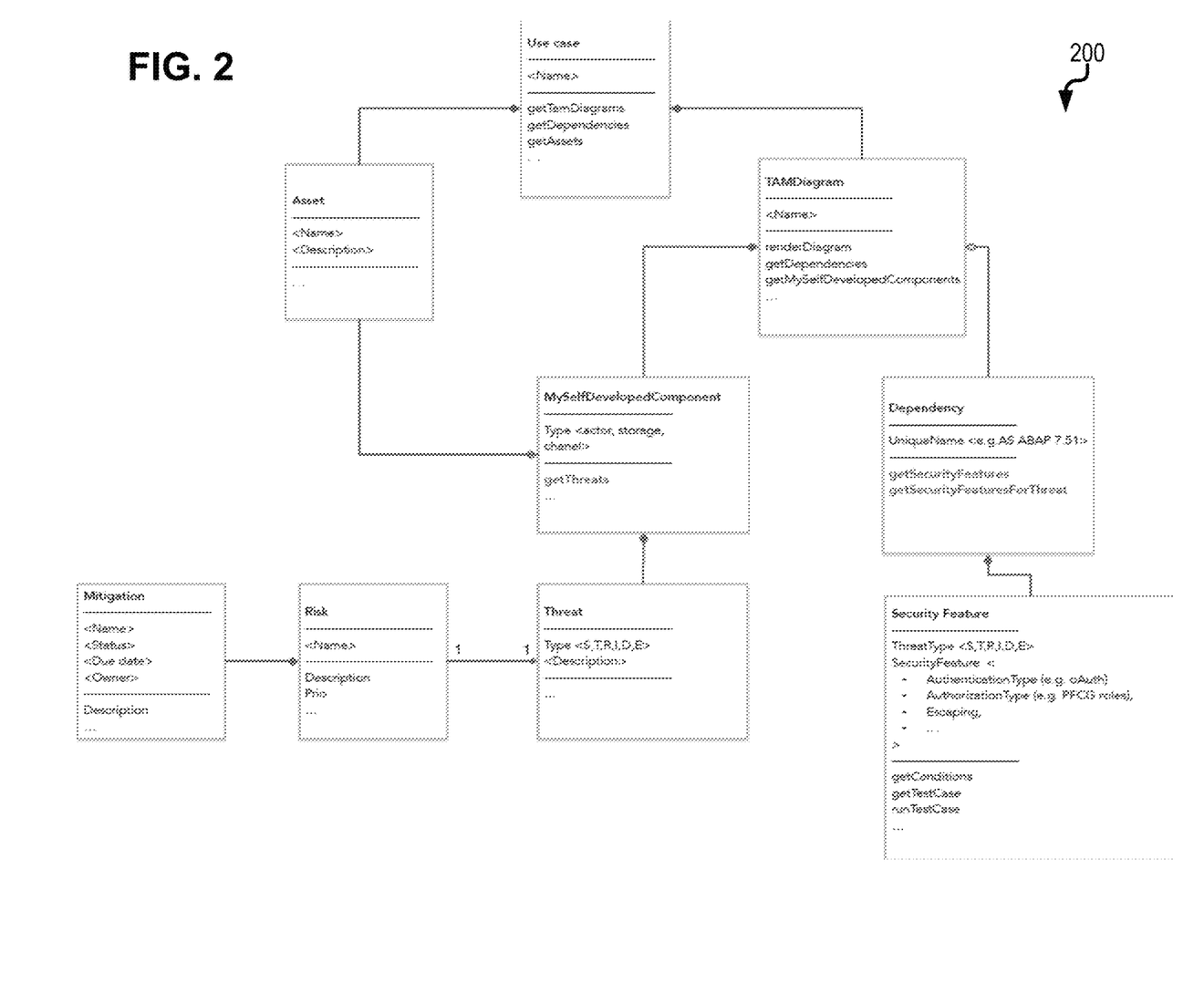
FIG. 2 is a class diagram for a threat modeling tool.

A first use case can be a modeling environment for generating a threat model including, for example, a target architecture model (TAM) diagram. The TAM diagram can be used to characterize the software architecture that implements the functionality to be threat modeled. When using the current threat modeling tool, a threat modeling expert, via a GUI, can model the security status of a particular use case of the software to be modeled by creating the TAM diagram interactively, adding security features such as the assets and risks identified, and by configuring components of the TAM diagram as "actor" or "dependency". This structure can be referred to as the threat model of a use case" and can include all the above mentioned attributes, components and configurations (c.f. FIG. 2)

After some components of the TAM diagram have been created (e.g. a sub diagram), either the modeler asks the system to check for a smart security scheme or the system starts a prediction on its own and proposes such a scheme. A threshold can be defined to prevent the system from making too much proposals, in case the "prefix" is still too general in nature.

A second use case can be to automatically generate a proposed secure software architecture based on the threat model. This generation is done automatically as described in further detail below.

A third use case is to convert the threat model into a machine readable format to enable it to be stored (as part of a fourth use case). Lastly, the stored threat models can be used to train machine learning models so that subsequent models can be rapidly generated in a fashion that optimally protects the underlying software system.

In most cases, the process of threat modeling ends-up in text-based reports. While this format is useful in the sense of meeting minutes, it is less adequate for working with threat models while checking for additional threats after changes to the software took place. Imagine a software development team that delivers code on a daily basis. Such a team would neither be able nor willing to conduct a full-blown threat modeling workshop every time they ship a new feature.

To address such issues, with the current subject matter, a threat model can be explicitly defined by means of a meta-model. Such a model can include elements to make the model consumable for highly agile teams as well. These elements can include, for example, "Use Cases", "Dependencies", "Security features or Application controls", "Conditions". These new elements help us to structure complex threat models.

In order to define such a structure, a description for use cases for which it is desired to conduct a threat model can be generated. Such a description can start with actors (human being or a machine) that triggers some action of the software system (e.g., a human clicking a GUI element). A prefix can be created which is the first element of a TAM diagram representing a use case of the software system that is being threat modeled. If the tool is able to recognize the prefix as the initial sequence of an already known threat model, the known threat model will be proposed. Otherwise, the TAM diagram can be created for the entire use case or use cases representing the software system that is being modeled because the TAM diagram is new to the system.

Thereafter, instead of creating a single TAM diagram for an entire software product, multiple TAM diagrams are created for any of the described use cases that are subject to a threat modeling activity/analysis.

Further, each element of the TAM diagram can be described as a "dependency" in case it is developed by a different entity. Stated differently, software that is reused that originates from third parties/organization units within an enterprise such as databases, operating systems, web browsers, and the like are considered as dependencies given that the security status of an actor "depends" on the security features the "dependency" provides. In addition, a dependency can be a component that the development team has developed. For instance, a particular authorization service that has been built by a particular team and can be reused by several components. Dependencies can provide security features (i.e., security functions). One example is oAuth which is a security feature that mitigates a threat such as spoofing because this feature ensures that it is the desired user who tries to log on and not somebody else trying to access the account. Each security feature of a dependency can include or otherwise provide a list of conditions that need to be met in order to make sure the security feature works as desired. In case of oAuth, there might be the following conditions: authentication by default three-legged, in case of two-legged, one token needs to expire after three minutes, and the like, etc.

When building a Web-App for analyzing existing data, for instance, existing services can be reused for authentication rather than building new services. For example, if running in Tomcat, one could use the Tomcat authentication services, for instance oAuth, or X509, etc. Each of these services can be referred to as a security feature to mitigate the risk of spoofing or other malicious activity. Thus, there can be a dependency called "Tomcat oAuth service". As it cannot be proved that such service works securely out of the box, the requirements for Tomcat need to be checked to guarantee its service runs safely. Such requirements are referred to herein as conditions (i.e. conditions that the software system needs to fulfill to meet the Tomcat requirements, etc.). If the conditions cannot be fulfilled, then there are risks that are added to the threat model.

Lastly, threat modeling can be performed for all TAM elements that are developed internally (i.e. not a dependency).

The end result will be a threat model that is organized along a list of the specified use cases. Each of those use cases is associated with a TAM model consisting of either dependencies or elements that are threat modeled internally (i.e. not by the third entity). This threat model can be encoded into an XML file that reflects the structure of the model. Below is an example XML file of a simplified threat model.

```
<!--Representation of persisted threat model. Dependencies are listed as
pairs of <Actor> and <Dependency>. The dependency lists the
Application Security Controls| (ASC) that are used as security features -->
<Use-Case> Call Service by Smartphone App
    <ExternalAgent> End__User <\ExternalAgent>
    <Brief> Short description of the end user's goal<\Brief>
    <Model>
        <Actor> A__Smartphone__App <\Actor>
        <Dependency> Backend__Service__1 <\Dependency>
    <\Model>
    <Model>
        <Actor> Backend__Service__1 <\Actor>
        <Dependency> Apache__Tomcat__1
            <ASC> E.g.__OAuth__Two__Legs <\ASC
            <ASC> Other__controls__here <\ASC
        <\Dependency>
    <\Model>
    <Model>
        <Actor> Backend__Service__2 <\Actor>
        <Dependency> Apache__Tomcat__1
            <ASC> E.g.__OAuth__Two__Legs <\ASC
            <ASC> Other__controls__here <\ASC
        <\Dependency>
    <\Model>
<\Use-Case>
```

Based on such threat models that are persisted or otherwise embodied as XML files, the current subject matter provides intelligent assistance to aid with the selection of the optimal threat model for the particular software implementation.

One or more machine learning models can be used to recognize or otherwise specify dependency recognition. For example, a machine learning model can be used to classify all names of the actor/dependency pairs in a way that, for instance, "Tomcat", "tom cat", "Apache tom_cat" are mapped to the identifier "Apache Tomcat". This classification is used to train a machine learning model that allows for recognizing the identifier of an already known dependency like "Apache Tomcat" Training and recognition can be performed by publically available tools such as "scikit-learn."

In some variations, the machine learning model(s) can utilize a class prediction algorithm such as k-nearest neighborhood (c.f. the iris data set). In such a case one needs to provide a data set for learning purposes that comprises two columns: observations: e.g., "tom cat" and the other one comprising class identifiers like "Apache Tomcat 8.0.45". As the number of dependencies in a software system varies considerably (from several dozen up to several hundred) such an approach becomes necessary as a pre-process before predicting the most adequate threat model.

Machine learning can also be used for dependency matching. For example, a second model can be trained that enables the threat assessment tool to predict whether a new use case is "near" to others that are already known to the threat assessment tool. Such a model can be trained using a machine learning model such as random forest. A near use case can be defined as the use case that has the best match of actor-dependency pairs. The set of threat models that are used for training purposes can be enhanced by a category per actor or dependency indicating the role such a component plays such as agent, storage, channel, etc.

Various types of machine learning models can be used for the dependency recognition and/or for the dependency matching. As one example, random forest techniques can be used.

The following is an example illustrating the use of random forest. An actor-dependency-pair consists for instance of a Web-App (actor) that uses Google Chrome (dependency). Chrome then calls (actor) an oData service (dependency) that accesses the backend. So there is a chain of pairs [(Web-App, Chrome), (Chrome, oData service)] that is potentially part of several already processed use cases.

If a model is trained with random forest, a prediction of the use case with the best fit can be determined. The sample set for the training can be all actor-dependency chains known to the system (=all use cases).

Random forest is advantageous in that it provides fast training times as well as fast prediction times even with a big set of input features.

Imagine a dependency such as SAP Application Server ABAP offers lots of security features. A typical ABAP-based backend application uses lots of those AS ABAP provided security features (e.g. authentication, authorization, encryption, sanitation methods, XSRF protection and so forth). A Java Script based Frontend adds further security features to the use case (e.g. SAP UI5). Each security feature consists of conditions to be met. Thus, the chains of actor/dependency pairs may grow considerably. Therefore efficient training and prediction algorithms are of high importance.

The base threats from, for example, a STRIDE threat model (as provided by Microsoft Corporation) for these basic elements (agent, storage, channel . . . ) can define the behavior of the "near" function. STRIDE can be used to analyze the threats of TAM elements such as actors, storages, and the like. As one example, in order to mitigate "Spoofing" ("S" of STRIDE), oAuth of Apache Tomcat can be used. Such an arrangement can be used to systematically discover dependencies, security features, their implementation, and conditions.

In case of dependencies, a similar analysis can be applied. Furthermore, STRIDE can also be applied to the dependency as well which, in turn, allows for the discovery of potential risks and to identify how to mitigate such risks via security features. STRIDE can also be applied to identify other dependencies.

In some variations, the threat assessment tool can propose (via a graphical user interface, etc.) security schemes in real-time as part of a GUI-based modeling environment. For example, while adding elements to a TAM model in such a GUI-based modeling environment, the tool can check for use cases that are near to the one that is being created. If the check is positive, the assistant proposes the security schemes of the best fitting use cases to the modeler via the GUI. The security scheme can, for example, comprise used dependencies including the following items (per dependency): application security control (simplified: security features) used, conditions required by the ASC/security feature, and configuration requirements of the dependency so as to run securely by default. Even test cases can be part of the dependency to check if all pre-conditions and configuration requirements are fulfilled.

When a development team creates the threat model of its software artifact, the GUI-based modeling environment can immediately equip users with a security scheme about how to set-up the dependencies (i.e. the elements to rely upon) in a secure manner. Such templates are smart in the sense that the tool can continually learn (i.e., it is adaptable based on predecessor implementations using the machine learning model(s)) what is the most adequate use case. Therefore, the more similar use cases are modeled, the more such use cases comply with a most popular scheme, thus iterating recursively towards a small set of security schemes. In case a dependency changes, only the dependency matching model needs to be retrained (the security security features/ASC can remain the same. In case there is a desire to have a security scheme become less widely utilized, then a sufficient number of threat models need to be reconfigured and the dependency matcher model retrained. As a result, the tool can propose a new security scheme.

The threat modeling tool can be provided for three roles. The modeler is the person who, for instance, creates a threat model. The assistant is a system component that proposes a security scheme whenever the threat model has been created or changed. The administrator is a human being or even a system component that regularly re-trains the models used for dependency recognition or dependency matching.

FIG. 2 is a class diagram 200 illustrating aspects in connection with a threat modeling tool. The core entity of a threat model is the use case. This entity embraces assets which are to be protected as well as one or more TAM diagrams. A TAM diagram consists of several Actor/Dependency pairs. A dependency mainly consists of a collection of security features, while an actor, in case it is self-developed, contains threats, risks, and mitigations.

Figure 3:
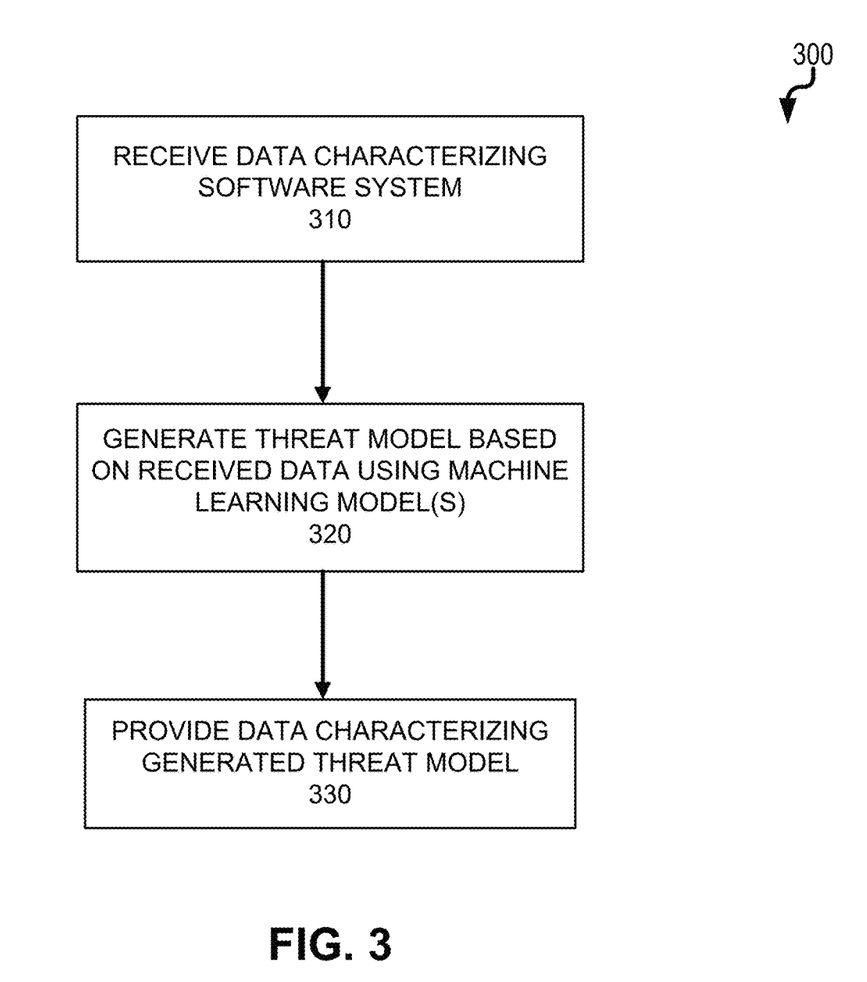
FIG. 3 is a process flow diagram illustrating the use of machine learning to recommend security schemes.

FIG. 3 is a process flow diagram 300 in which, at 310, data is received that characterizes a software system. Thereafter, at 320, a threat model is generated using at least one machine learning model that optimally characterizes cybersecurity threats associated with the software system and which provides security measures to counter such threats. The at least one machine learning model is trained using a plurality of historically generated threat models for a plurality of differing software systems. Later, at 330, data that includes the generated threat model is provided (e.g., displayed, transmitted, stored, loaded into memory).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 4:
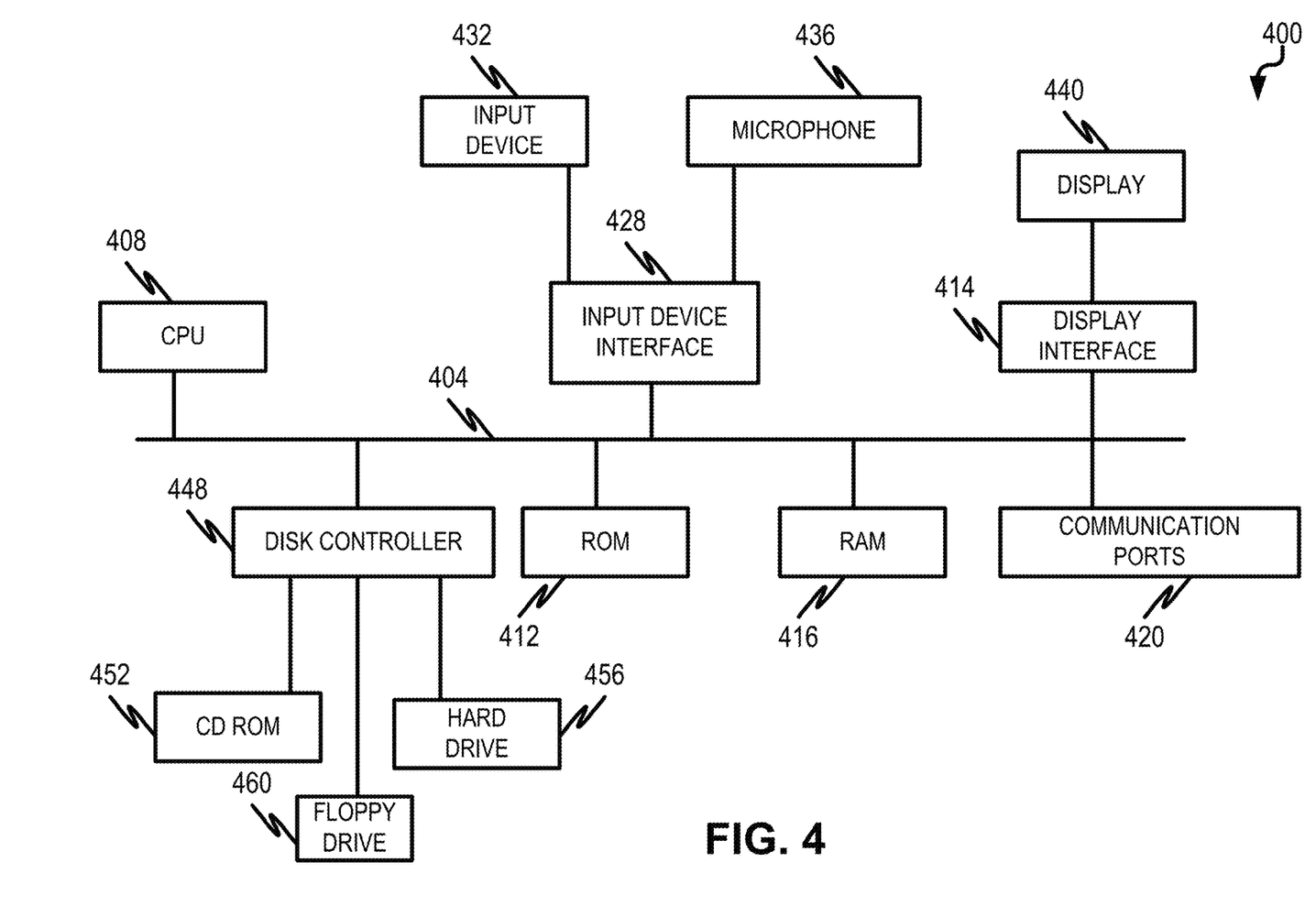
FIG. 4 is a diagram of a computing device for implementing aspects described herein.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by at least one computing device comprising:
receiving data comprising actor/dependency information characterizing a software system;
decomposing the software system to define data flow diagrams characterizing interactions of the software system with external entities and networks;
generating a target architecture model (TAM) diagram based on the decomposed software system;
rendering the TAM diagram in a graphical user interface;
receiving-user generated input, via the graphical user interface, modifying the TAM diagram to include additional elements;
identifying, using the at least one machine model, a use case for the modified TAM diagram;
displaying proposed security schemes to add to the threat model based on the identified use case;
generating, by at least one machine learning model using the modified TAM diagram, a threat model that optimally characterizes cybersecurity threats associated with the software system and provides suggestions for security measures to counter such threats prior to deployment of the software system, the at least one machine learning model being trained using a plurality of historically generated threat models for a plurality of differing software systems; and
providing data comprising the generated threat model.

2. The method of claim 1, wherein a first machine learning model of the at least one machine learning model classifies the TAM diagram by actor/dependency pairs.

3. The method of claim 2, wherein a second machine learning model of the at least one machine learning model matches the received data to an optimal use case.

4. The method of claim 1, wherein the at least one machine learning model utilizes random forest for identifying an optimal threat model template and generating the threat model.

5. The method of claim 1, wherein the providing data comprises at least one of:
causing the data comprising the generated threat model to be displayed in an electronic visual display, transmitting the data comprising the generated threat model to a remote computing system, loading the data comprising the generated threat model into memory, or storing the data comprising the generated threat model into physical persistence.

6. The method of claim 1, wherein generating the target architecture model (TAM) diagram comprises reusing a previously generated TAM diagram.

7. The method of claim 1, wherein generating the target architecture model (TAM) diagram comprises generating a plurality of target TAM diagrams for different aspects of the software system.

8. A system comprising:
at least one data processor; and
memory storing instructions which, when executed by the at least one data processor, result in operations comprising:
receiving data comprising actor/dependency information characterizing a software system;
decomposing the software system to define data flow diagrams characterizing interactions of the software system with external entities and networks;
generating a target architecture model (TAM) diagram based on the decomposed software system;
rendering the TAM diagram in a graphical user interface;
receiving-user generated input, via the graphical user interface, modifying the TAM diagram to include additional elements;
identifying, using the at least one machine model, a use case for the modified TAM diagram;
displaying proposed security schemes to add to the threat model based on the identified use case;
generating, by at least one machine learning model using the modified TAM diagram, a threat model that optimally characterizes cybersecurity threats associated with the software system and provides suggestions for security measures to counter such threats prior to deployment of the software system, the at least one machine learning model being trained using a plurality of historically generated threat models for a plurality of differing software systems; and
providing data comprising the generated threat model.

9. The system of claim 8, wherein a first machine learning model of the at least one machine learning model classifies the TAM diagram by actor/dependency pairs.

10. The system of claim 9, wherein a second machine learning model of the at least one machine learning model matches the received data to an optimal use case.

11. The system of claim 8, wherein the at least one machine learning model utilizes random forest for identifying an optimal threat model template and generating the threat model.

12. The system of claim 8, wherein the providing data comprises at least one of:
causing the data comprising the generated threat model to be displayed in an electronic visual display, transmitting the data comprising the generated threat model to a remote computing system, loading the data comprising the generated threat model into memory, or storing the data comprising the generated threat model into physical persistence.

13. The system of claim 8, wherein generating the target architecture model (TAM) diagram comprises reusing a previously generated TAM diagram.

14. The system of claim 8, wherein generating the target architecture model (TAM) diagram comprises generating a plurality of target TAM diagrams for different aspects of the software system.

15. A non-transitory computer program product storing instructions which, when executed by at least one data processor forming part of at least one computing device, result in operations comprising:
receiving data comprising actor/dependency information characterizing a software system;
decomposing the software system to define data flow diagrams characterizing interactions of the software system with external entities and networks;
generating a target architecture model (TAM) diagram based on the decomposed software system;
rendering the TAM diagram in a graphical user interface;

receiving-user generated input, via the graphical user interface, modifying the TAM diagram to include additional elements; and identifying, using the at least one machine model, a use case for the modified TAM diagram;

displaying proposed security schemes to add to the threat model based on the identified use case;

generating, by at least one machine learning model using the modified TAM diagram, a threat model that optimally characterizes cybersecurity threats associated with the software system and provides suggestions for security measures to counter such threats prior to deployment of the software system, the at least one machine learning model being trained using a plurality of historically generated threat models for a plurality of differing software systems; and providing data comprising the generated threat model.

16. The computer program product of claim 15, wherein a first machine learning model of the at least one machine learning model classifies the TAM diagram by actor/dependency pairs.

17. The computer program product of claim 16, wherein a second machine learning model of the at least one machine learning model matches the received data to an optimal use case.

18. The computer program product of claim 15, wherein the at least one machine learning model utilizes random forest for identifying an optimal threat model template and generating the threat model.

19. The computer program product of claim 15, wherein the providing data comprises at least one of:

causing the data comprising the generated threat model to be displayed in an electronic visual display, transmitting the data comprising the generated threat model to a remote computing system, loading the data comprising the generated threat model into memory, or storing the data comprising the generated threat model into physical persistence.

20. The computer program product of claim 15, wherein generating the target architecture model (TAM) diagram comprises generating a plurality of target TAM diagrams for different aspects of the software system.

* * * * *